(No Model.)
D. W. SAXTON.
VELOCIPEDE.
No. 413,104. Patented Oct. 15, 1889.
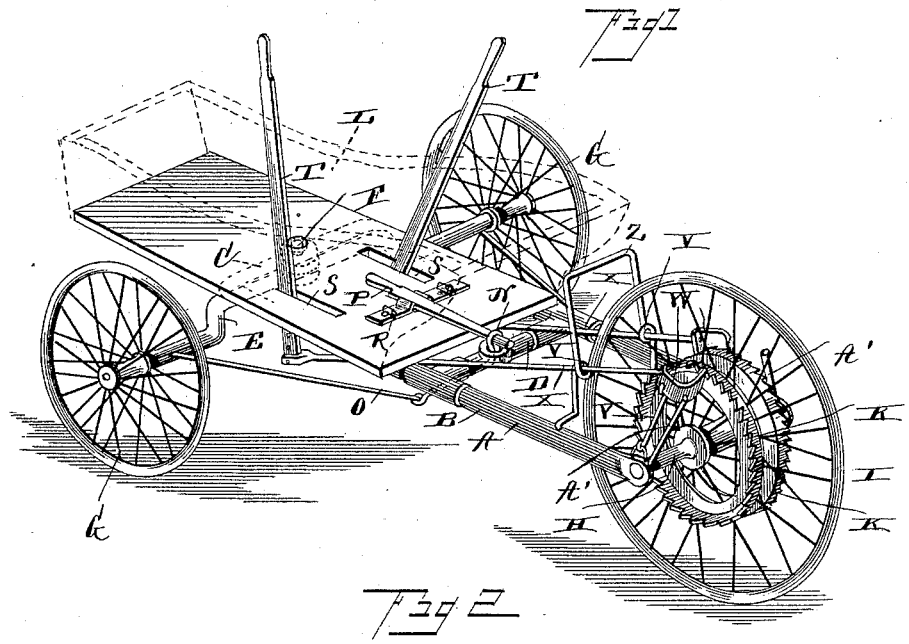
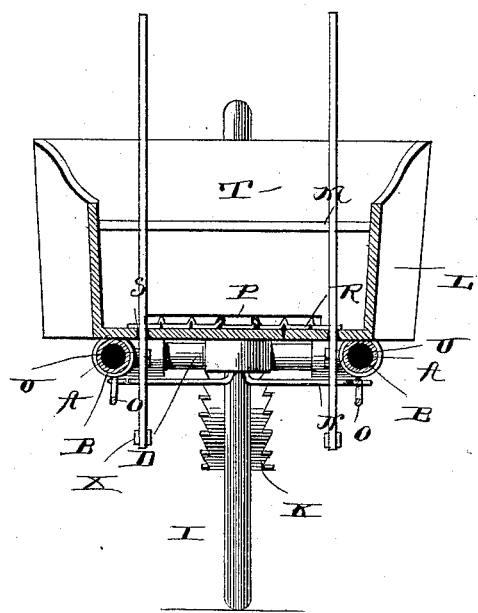
Witnesses
John Imirie
J. W. Garner
Inventor
Daniel W. Saxton.
By his Attorneys

UNITED STATES PATENT OFFICE.

DANIEL W. SAXTON, OF BREWSTER, NEBRASKA.

VELOCIPEDE.

SPECIFICATION forming part of Letters Patent No. 413,104, dated October 15, 1889.

Application filed February 20, 1889. Serial No. 300,545. (No model.)

*To all whom it may concern:*

Be it known that I, DANIEL W. SAXTON, a citizen of the United States, residing at Brewster, in the county of Blaine and State of Nebraska, have invented a new and useful Improvement in Velocipedes, of which the following is a specification.

My invention relates to an improvement in velocipedes; and it consists in the peculiar construction and combination of devices, that will be more fully set forth hereinafter, and particularly pointed out in the claims.

In the accompanying drawings, Figure 1 is a perspective view of a velocipede embodying my improvements. Fig. 2 is a transverse sectional view of the same.

A represents a frame comprising a pair of longitudinal bars B, connected at their front ends by a bar C, and connected at a suitable distance from their rear ends by a bar D.

E represents a bent or offset axle, which is pivoted under the center of the bar C on a king-bolt F. To the said axle are secured guiding and supporting wheels G.

H represents a shaft or axle, which connects the rear end of the bars B. On the said shaft is mounted a driving and supporting wheel I, the same being provided on opposite sides with ratchets K.

L represents the box or body of the velocipede, which is mounted on the front portions of the bars B, and has a seat M in its rear end.

A yoke N is provided with a central spindle pivoted in a vertical opening in the center of the bar D. The extremities of the yoke are connected to the axle E, near the ends thereof, by means of link-rods O, and to the upper end of the spindle of the yoke is attached a tiller or steering-bar P, which extends forward through an opening in the rear side of the box or body, and engages a rack-bar R on the bottom of the box or body, whereby the said tiller may be maintained at any desired adjustment. It will be understood that the tiller may be operated by the feet of the occupant of the velocipede and the front axle caused to turn on the king-bolt, and thereby direct or guide the velocipede in any desired direction.

T represents a pair of hand-levers, which are fulcrumed on studs U on the inner sides of bars B. The said hand-levers extend up through and work in slots S in the bottom of the box or body.

V represents a pair of vibrating arms, which have their lower ends pivoted loosely on the rear ends of the bars B. To the upper ends of the said vibrating arms are loosely pivoted pawls W, and the same are connected to the lower ends of the levers T by means of rods X. The said rods pass through and are guided in eyes or openings Y, formed in a yoke Z, which is arranged astride of the wheel I, and has its lower ends secured to the bars B. A pair of rods A′, projecting upward from the rear ends of the bars B, incline inward toward the wheel I, and are arranged in the paths of the pawls W.

The operation of my invention is as follows: The hand-levers T, being moved back and forth, cause the arms D to vibrate and the pawls to successively engage the ratchets at the rear limit of their strokes, and impart rotary motion of the wheel I as they move forward, thereby causing the velocipede to be propelled. As each pawl moves rearward it comes in contact with its companion tappet-arm A′, which forces it laterally inward toward and into engagement with the adjacent ratchet-wheel. Owing to the shape of the ratchet-teeth the pawls, when they reach the forward limit of their strokes and start to move rearward, slip idly over the ratchet-teeth until they reach the rearward limit of their movement, when they take a fresh grip, in the manner above stated.

Having thus described my invention, I claim—

1. The combination, in a velocipede, of the driving-wheel having the ratchets on opposite sides thereof, the levers, the vibrating arms V, the pawls connected to the said arms and adapted to engage the ratchets, and the rods connecting the said pawls to the levers, substantially as described.

2. The combination, in a velocipede, of the driving-wheel having the ratchets, the vibrating arms V, pivotally connected to the frame, the pawls pivotally connected to the vibrating arms, the levers, the rods connecting the same to the pawls, and the tappet-rods arranged in the paths of the pawls and adapted to move the latter into engagement with the ratchets, substantially as described.

3. The combination, in a velocipede, of the frame, the steering-axle pivotally connected thereto, the driving-wheel journaled to the frame and having the ratchets, the vibrating arms pivotally connected to the frame, the pawls connected to the vibrating arms and adapted to engage the ratchets, the levers, the rods connecting the same to the pawls, and the yoke pivoted to the frame connected to the steering-axle, and having the tiller, substantially as described.

In testimony that I claim the foregoing as my own I have hereto affixed my signature in presence of two witnesses.

DANIEL W. SAXTON.

Witnesses:
L. H. HARRIS,
JOHN ALBRIGHT.